United States Patent [19]

Igawa

[11] Patent Number: 5,092,627
[45] Date of Patent: Mar. 3, 1992

[54] RETAINER FOR AIR BAG SYSTEM

[75] Inventor: Tadahiro Igawa, Shiga, Japan

[73] Assignee: Takata Corporation, Tokyo, Japan

[21] Appl. No.: 616,066

[22] Filed: Nov. 20, 1990

[30] Foreign Application Priority Data

Dec. 14, 1989 [JP] Japan .................. 1-324415

[51] Int. Cl.⁵ ............................. B60R 21/16
[52] U.S. Cl. .................. 280/728; 248/909; 280/731; 280/732
[58] Field of Search .......... 280/728, 730, 731, 732, 280/741, 743, 736; 248/909

[56] References Cited

U.S. PATENT DOCUMENTS

| | | | |
|---|---|---|---|
| 3,764,160 | 10/1973 | Fiala | 280/735 |
| 3,794,349 | 2/1974 | Fuller | 280/731 |
| 4,852,907 | 8/1989 | Shiraki et al. | 280/731 |
| 4,943,027 | 7/1990 | Nakayama | 280/731 |
| 4,989,897 | 2/1991 | Takada | 280/732 |

FOREIGN PATENT DOCUMENTS

| | | |
|---|---|---|
| 1954398 | 5/1971 | Fed. Rep. of Germany ...... 280/728 |
| 76344 | 5/1983 | Japan . |
| 2228235 | 8/1990 | United Kingdom . |
| 2231003 | 11/1990 | United Kingdom . |

*Primary Examiner*—Charles A. Marmor
*Assistant Examiner*—Tamara L. Finlay
*Attorney, Agent, or Firm*—Kanesaka and Takeuchi

[57] ABSTRACT

A retainer for an air bag system having a plate member to which an air bag is attached and a module cover mounting member comprising a stand piece stood from an edge of the plate member, wherein a portion having low flexural rigidity for deforming the stand piece at the time of cleavage of the module cover is provided at the base side of the stand piece.

10 Claims, 5 Drawing Sheets

RETAINER FOR AIR BAG SYSTEM

FIELD OF THE INVENTION AND RELATED ART STATEMENT

The present invention relates to a retainer for an air bag system for protecting occupant by opening an air bag at the time of colliding or so of a car.

In the air bag system, an air bag which is in the state of folding is attached to a mounting plate called a retainer, and the air bag is covered by a module cover. The module cover is similarly attached to the retainer and contains a tear line (fragile linear portion) for starting a cleavage when the air bag opens.

Further, an inflator is attached to the retainer directly or through an appropriate mounting member, and the inflator discharges a gas at the time of car collision to open the air bag immediately.

One example of the conventional retainer for air bag system is explained based on FIGS. 7 and 8 as follows.

In FIG. 7, a retainer 10 has a module cover mounting member comprising a plate member 14 and a standing piece 16 for standing to the reverse direction of the occupant from an edge of the plate member 14. The air bag 12 is covered by the module cover 18 in the state of folding, and a base side of the module cover 18 is fixed by a rivet 20 relative to the stand piece 16. An inflator 22 is fixed on the retainer 10 so that a top end of the inflator projects within the air bag 12 through an opening 24 which is formed in the plate member 14. A ring 26 is a member for mounting the air bag, and the edge portion of the opening of the air bag 12 is sandwiched by the ring 26 and the edge portion of the opening 24 of the plate member 14. Whereby, the air bag 12 is fixed on the retainer 10. The reference numeral 28 is a tear line formed on the module cover 18.

If the inflator 22 actuates in response to the car collision in such air bag system having above-mentioned structure, a large amount of gas is discharged from the inflator 22 immediately, thereby to start the opening of the air bag 12. According to the opening of the air bag 12, the module cover 18 cleaves along the tear line 28 as shown in FIG. 8, and the air bag 12 opens immediately within the car to protect the occupant.

In the conventional retainer of the air bag system, the module cover mounting member comprising the stand piece 16 had high flexural rigidity as a whole. Therefore, as shown in FIG. 8, when the module cover 18 cleaved, the deformation of the module cover 18 to the opening direction at the base side was restricted by the stand piece 16. Further, although the module cover opened as shown by a in FIG. 8 just after the air bag 12 was inflated, it was going to return to the position of a' soon. Accordingly, the air bag 12 was lifted up to the side of occupant by a force of a sector portion of the cleaved module cover 18 to return to the original position (directions A and B in FIG. 8). Furthermore, since a flow stress of the module cover 18 at the time of opening was applied on the whole of the retainer 10, the plate member 14 to which the inflator 22 was attached, was needed to have high strength to cope with such deformation.

OBJECT AND SUMMARY OF THE INVENTION

The object of the present invention is to provide an improved retainer for an air bag system with stable opening of the air bag, wherein the module cover deforms so as to open to the side direction enough when the air bag opens, the air bag also opens to the side direction enough, and the force of lifting the air bag to the side of occupant, which is made by reducing force that the module cover is going to return to the original position.

The another object of the present invention is to provide an improved retainer for an air bag system, wherein a stress applied to the retainer when the module cover deforms by the cleavage, concentrates on the portion having low flexural rigidity, thereby to reduce the needed strength of the other portion of the retainer.

According to the present invention, in the retainer for the air bag system having the module cover mounting member comprising the plate member to which the air bag is attached and the stand piece standing from the edge portion of the plate member, a portion having low flexural rigidity for deforming the stand piece when the module cover cleaves, is provided on the base side of the stand piece.

According to the retainer for the air bag system of the present invention, when the module cover cleaves and deforms at the time of opening the air bag, the stand piece also deforms along the portion having low flexural rigidity easily. Therefore, the deformation of the module cover is not restricted, and the module cover can open to the side direction immediately and sufficiently and the air bag can also open to the side direction sufficiently.

Further, in the air bag system providing the retainer of the present invention, since the air bag interposes in the front of the occupant in the stable state when the car collision occurs, it is possible to achieve the protection of occupant more securely.

Furthermore, in the air bag system providing the retainer of the present invention, as shown in FIG. 6, it is possible to cleave into four directions in comparison with the conventional system in which the cleavage can be achieved to only two directions.

DESCRIPTION OF THE PREFERRED EMBODIMENTS

Hereinafter, the reference is made to an explanation of the embodiments based on the drawings.

Figure 1:
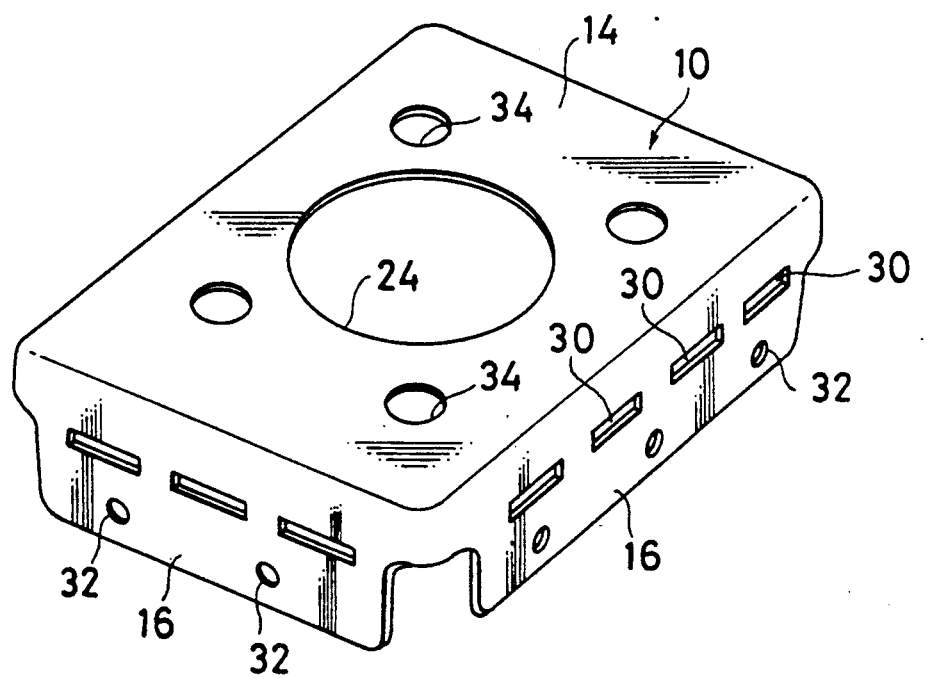
FIG. 1 is a perspective view of the retainer according to one embodiment of the present invention.
Figure 2:
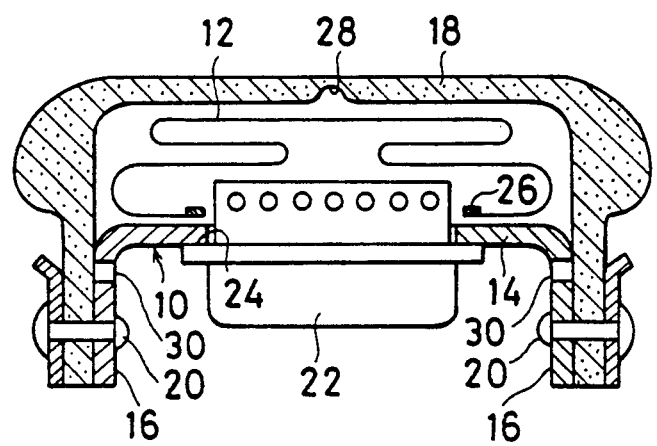
FIG. 2 is a sectional view of the air bag system using the retainer of the present invention.
Figure 3:
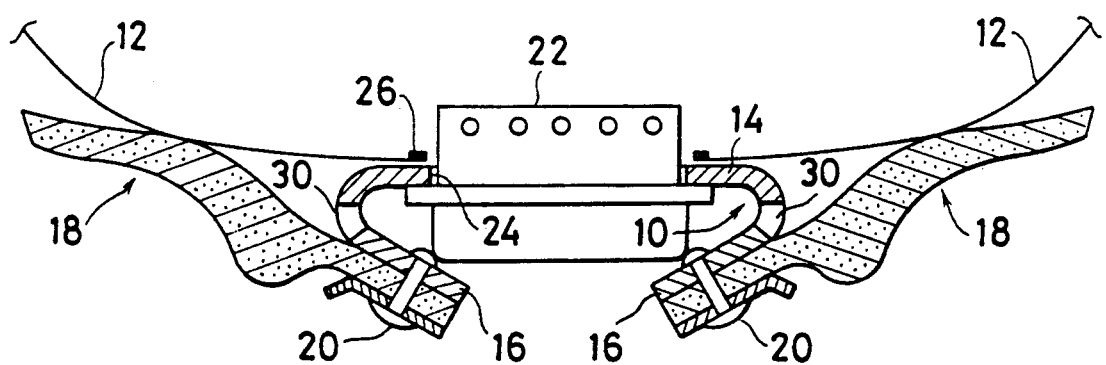
FIG. 3 is a view for explaining an operation of the air bag system.

FIG. 1 is a perspective view of the retainer for the air bag system according to one embodiment of the present invention. FIG. 2 is a sectional view of the air bag system using the retainer of FIG. 1. FIG. 3 is a view for explaining the operation of the air bag system of the present invention.

The retainer according to the present invention provides portions having low flexural rigidity by forming slits 30 along the portions of the base sides of the stand pieces 16. The reference numeral 32 is a rivet hole of the module cover mounting member comprising the stand pieces 16, and 34 a rivet hole of the plate member 14.

The other marks as shown in FIGS. 1 and 2 show the same members as those in the conventional example.

According to the retainer for air bag system or the air bag system providing the retainer as mentioned above, the inflator 22 actuates to open the air bag 12, and then the module cover 18 cleaves along the tear line 28, thereby to open the air bag 12 into the inner direction of the car. At this time, the stand piece 16 is immediately bent along the slit 30. The module cover 18 starts to open to the side direction sufficiently. As a result of that, the air bag 12 also opens to the side direction of the plate member 14 widely. Further, the force of the module cover to lift the air bag to the side of occupant is reduced.

Figure 4A:
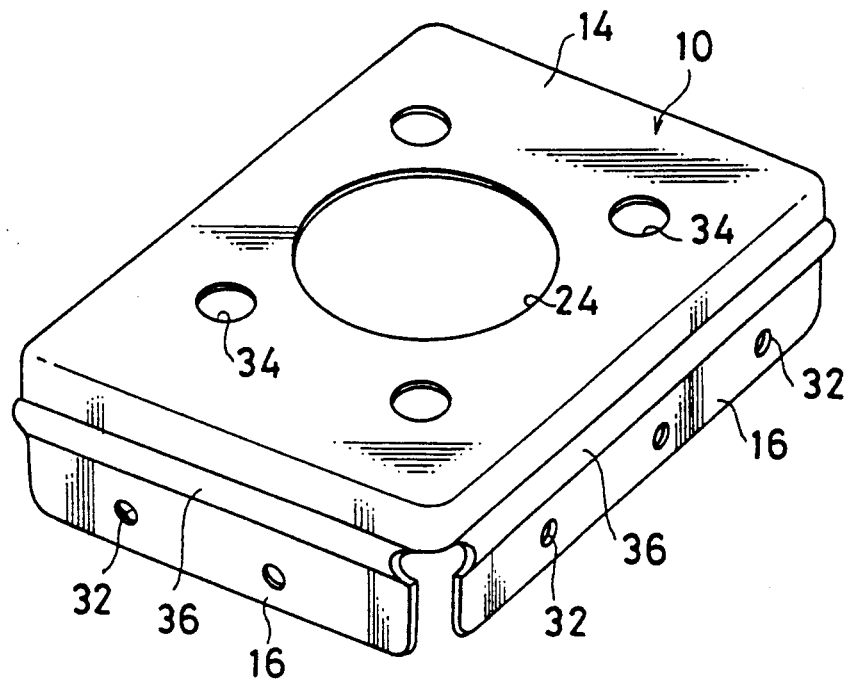
FIGS. 4A and 4B are perspective views for showing another embodiments of the present invention, respectively.
Figure 4B:
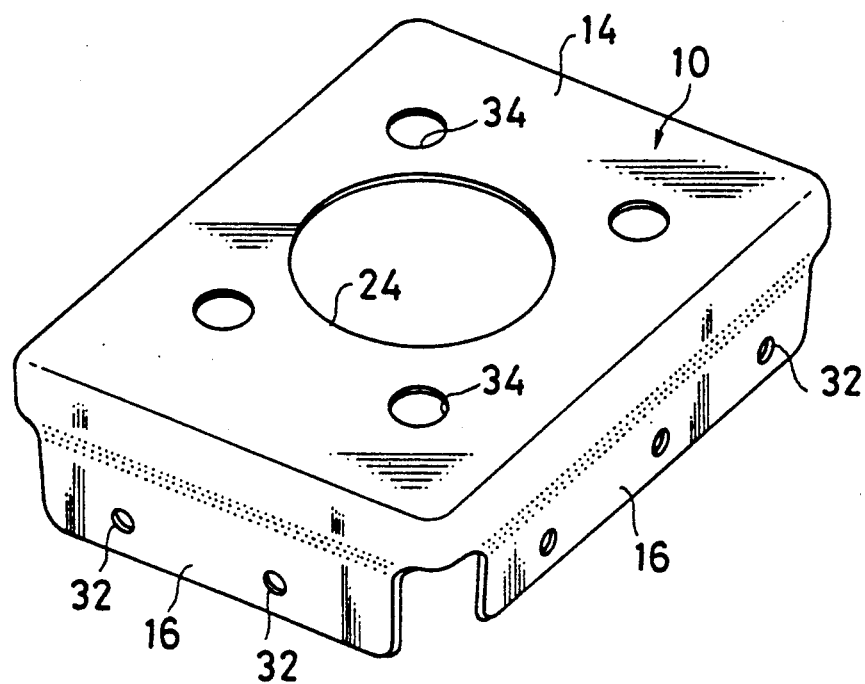
Figure 5:
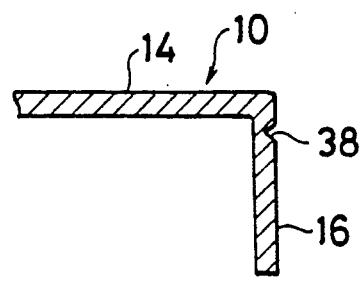
FIG. 5 is a sectional view of the subject portion of the retainer as shown in FIGS. 4A and 4B.
Figure 6:
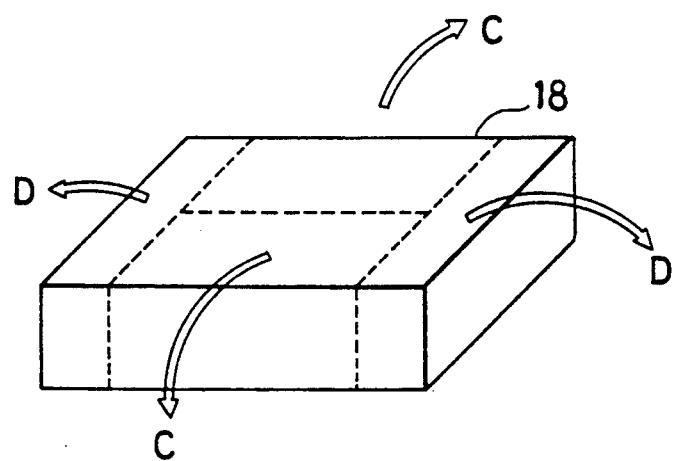
FIG. 6 is a view for showing the cleavage of the module cover.
Figure 7:
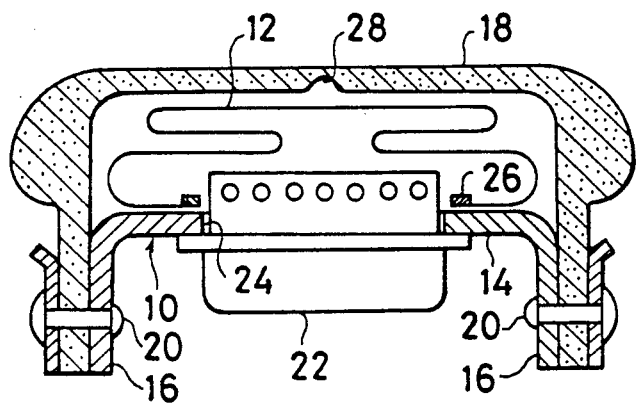
FIG. 7 is a vertical sectional view of the conventional air bag system.
Figure 8:
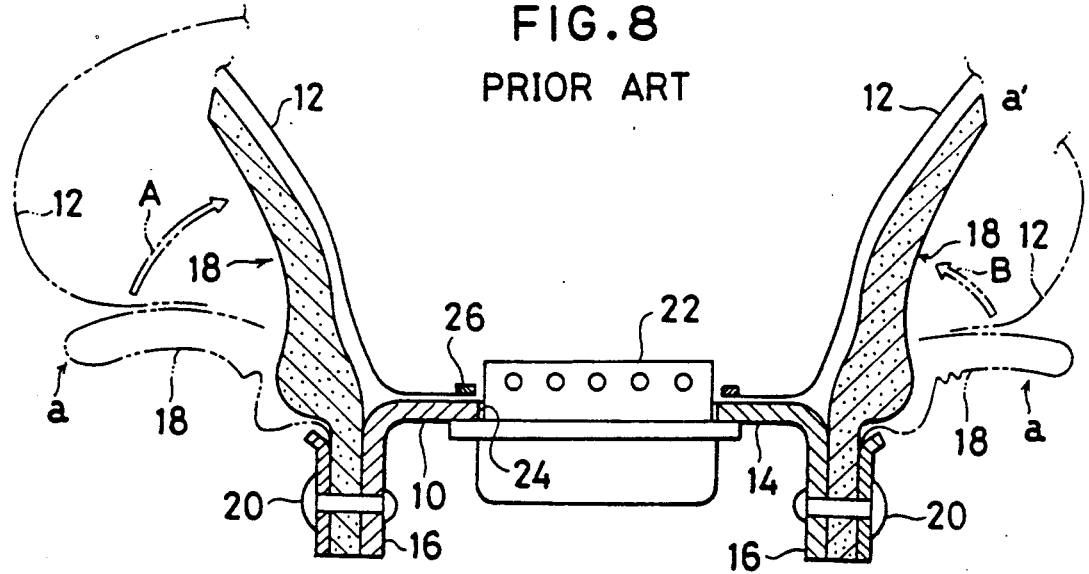
FIG. 8 is a view for explaining the operation of the conventional air bag system.

In the above embodiment, the portion having low flexural rigidity is formed by forming the slits 30. However, as shown in FIG. 4, the portion having low flexural rigidity may be formed by forming a bead 36. The bead 36 extends from one end of the stand piece 16 to the other end thereof along the edge of the plate member 14, and a sectional shape perpendicular to a longitudinal direction has a circular shape, an elliptic shape, or a triangle. (The only sectional shape of the circular shape is shown in the drawing.) Further, as shown in FIG. 5, the portion having low flexural rigidity may be formed by forming a groove 38. Furthermore, as shown in FIG. 4B, the portion having low flexural rigidity may be formed by performing a thermal treatment such as an annealing at the portion as shown by dots in the base side of the stand piece 16. The dots in FIG. 4B is to show the region where the annealing is performed, and is not to show any features in the appearance. The bead 36 and the annealing may be provided continuously from one end of the stand piece 16 to the other end thereof and may be provided intermittently as same as the slit 30 of FIG. 1.

The stand piece 16 stands to the opposed side of the occupant relative to the plate member 14 in the above embodiment. However, it can stand to the side of the occupant.

Further, although the inflator is attached to the retainer directly in the above embodiment, the inflator can be attached to the retainer through an appropriate member.

What is claimed is:

1. A retainer for an air bag system adapted to be attached to edge portions of a modular cover for covering an air bag, comprising:
    a plate member for receiving the air bag thereon;
    module cover mounting members integrally formed with the plate member, said mounting members extending from the plate member at a predetermined angle relative to the plate member, said mounting members having connecting portions adapted to be attached to the modular cover, said air bag being retained between the module cover and the plate member when assembled; and
    low flexural rigidity portions formed on the mounting members, each low flexural rigidity portion extending along the connecting portion and being situated between the connecting portion and the plate member so that when the module cover is opened by inflation of the air bag, the mounting members are pushed by the module cover and are bent at the low flexural rigidity portions to allow the module cover to keep in an opened condition without affecting to the air bag.

2. The retainer of claim 1, wherein said low flexural rigidity portion is formed of at least one slit.

3. The retainer of claim 1, wherein said low flexural rigidity portion is formed of a bead.

4. The retainer of claim 1, wherein said low flexural rigidity portion is formed by a thermal treatment.

5. The retainer of claim 1, wherein said low flexural rigidity portion is provided continuously from one end of the mounting member to another end.

6. The retainer of claim 1, wherein said low flexural rigidity is provided intermittently from one end of the mounting member to another end.

7. The retainer of claim 1, wherein said plate member has a rectangular shape with four side portions, said mounting members being formed on the respective side portions to be connected to the module cover at the mounting members.

8. The retainer of claim 1, wherein said mounting members project from the plate member to a side opposite to an occupant.

9. An air bag system, comprising:
    an air bag,
    a retainer for holding the air bag thereon, said retainer including a plate member for receiving the air bag thereon; module cover mounting members integrally formed with the plate member, said mounting members extending from the plate member at a predetermined angle relative to the plate member and having connecting portions; and low flexural rigidity portions formed on the mounting members, each low flexural rigidity portion extending along the connecting portion and being situated between the connecting portion and the plate member,
    a module cover attached to the connecting portions of the mounting members, said air bag being retained between the modular cover and the plate member so that when the module cover is opened by inflation of the air bag, the mounting members are pushed by the module cover and are bent at the low flexural rigidity portions to allow the module cover to keep in an opened condition without affecting to the air bag.

10. An air bag system according to claim 9, wherein said module cover includes at least one tear line thereon, said module cover, when the air bag is inflated, being opened along the tear line and pushed outwardly from the plate member by bending the mounting members along the low flexural rigidity portions so that the module cover does not interfere an inflated air bag.

* * * * *